United States Patent [19]

Kilmer

[11] 4,271,594
[45] Jun. 9, 1981

[54] FILAMENT-TYPE WEED-GRASS TRIMMER

[76] Inventor: Lauren G. Kilmer, 1927 E. 35th Pl., Tulsa, Okla. 74105

[21] Appl. No.: 958,518

[22] Filed: Nov. 7, 1978

Related U.S. Application Data

[63] Continuation of Ser. No. 771,400, Feb. 23, 1977, abandoned.

[51] Int. Cl.³ .................................... A01D 50/00
[52] U.S. Cl. ................................... 30/276; 56/12.7
[58] Field of Search ................ 56/12.7, 295; 30/276

[56] References Cited

U.S. PATENT DOCUMENTS

| | | | |
|---|---|---|---|
| 2,254,521 | 9/1941 | Gardner | 226/127 |
| 3,664,102 | 5/1972 | Reber | 56/295 |
| 3,708,967 | 1/1973 | Geist et al. | 56/12.7 |
| 3,831,278 | 8/1974 | Voglesonger | 30/276 |
| 3,928,911 | 12/1975 | Pittinger | 30/276 |
| 4,211,004 | 7/1980 | Woods | 30/276 |

FOREIGN PATENT DOCUMENTS 1657039  10/1970  Fed. Rep. of Germany ............. 56/295

Primary Examiner—Jimmy C. Peters
Attorney, Agent, or Firm—Head & Johnson

[57] ABSTRACT

An improved filament trimmer of the type in which a rotary drive means having a hollow filament feed shaft is frame mounted and has an improved slinger head attached to said hollow shaft with an arcuate bore therethrough in open communication with the hollow shaft for swinging the cutting filament line in a radial plane to the shaft axis. A positive filament feed control is used for metering the cutting line to or from the slinger head.

4 Claims, 7 Drawing Figures

FILAMENT-TYPE WEED-GRASS TRIMMER

This is a continuation of application Ser. No. 771,400 filed Feb. 23, 1977, now abandoned.

BACKGROUND OF THE INVENTION

1. Field of the Invention

This invention relates to an improved hollow shaft filament trimmer for use in safely cutting vegetation.

2. Description of the Prior Art

Filament-type vegetation trimmers are well known in the art. With such apparatus, a length of stiff filament line is rapidly slung in a circular arc to provide cutting means which are relatively safe to use in comparison with bladed trimming mechanisms.

The better models of said trimmers normally use a frame mounted rotary drive means having a hollow output shaft. A length of filament line is fed through the hollow shaft to a rotating head mounted on said shaft which engages the line and slings it in a radial plane to the shaft axis. As the cutting line wears or breaks, additional line is fed through the hollow shaft to the rotating head from a reserve supply of filament mounted above the rotary drive means. As the centrifugal force of the moving line will pull the line from the reserve filament, the filament trimmers have a filament lock interposed between the reserve supply and the hollow shaft which may be released to allow additional line to descend through the hollow shaft to the rotating head.

The hollow shaft feed filament trimmer disclosed in U.S. Pat. Application No. 3,928,911 is illustrative of such a trimmer. In the aforementioned invention, the rotating head mounted to the hollow shaft comprises an open-ended bellmouth structure having one or more radial grooves for engaging and swinging the filament in a plane perpendicular to the hollow shaft. A pair of spring biased toothed jaws grip the filament line above the hollow shaft, and a manual control mechanism is used to open the jaws during operation for feed of additional line to the bellmouth through the hollow shaft.

The aforementioned device and similar type trimmers have certain disadvantages incorporated therein which become apparent upon observation. One problem lies in initially getting the filament line to swing in the radial plane. Admittedly, once the filament is started swinging, centrifugal force might keep the line pressed in the radial groove of the open bellmouth, however, there is nothing disclosed to initiate such an action. In addition, the rotation of the head forces the filament to turn in the bellmouth groove which tends to roll the filament from the groove. Furthermore, if the filament is swinging rapidly, the centrifugal force on the line makes the addition of fresh filament a matter of guesswork and there are no convenient means to retrieve excess filament once an error has been made.

It is therefore an object of this invention to provide an improved hollow shaft filament trimmer having a novel rotating head and positive filament control means which overcome the problems associated with the prior art.

SUMMARY OF THE INVENTION

The present invention contemplates a novel improved filament trimmer which is designed to surmont the difficulties inherent in the prior art. The trimmer includes a frame mounted rotary drive means having a hollow output shaft providing a conduit for the passage of filament therethrough. Attached to one end of the hollow shaft is an improved slinger head having at least one arcuate duct therethrough, one end of said duct in substantial alignment and in open communication with the filament conduit of the hollow output shaft, and the other end of said duct projects generally in a radial direction from the hollow output shaft.

An annular cup is mounted to the opposite end of the rotary drive means from the slinger head for the storage of filament line. A distributor having a central axial opening therethrough in substantial alignment and in open communication with the filament conduit of the hollow output shaft is rotatably mounted in the center of the annular cup with the head of said distributor projecting above the inner annular cup rim. The head of the distributor is also provided with at least one groove directed from the central opening towards the inner annular cup rim.

Means are provided for rotating the distributor, such as a toothed pinion gear engaging slots along the bottom periphery of the distributor.

In operation, a coil of filament is placed in the annular cup. One end of the filament is secured to the cup, and the other end is threaded in sequence through the distributor groove, distributor central opening, hollow output shaft, and the slinger head arcuate bore. Additional filament can be positively fed to replace broken or worn filament by rotation of the distributor in the opposite direction of the filament winding. To retrieve excess filament line, the direction of the distributor rotation is reversed.

DETAILED DESCRIPTION OF THE PREFERRED EMBODIMENTS

Figure 1:
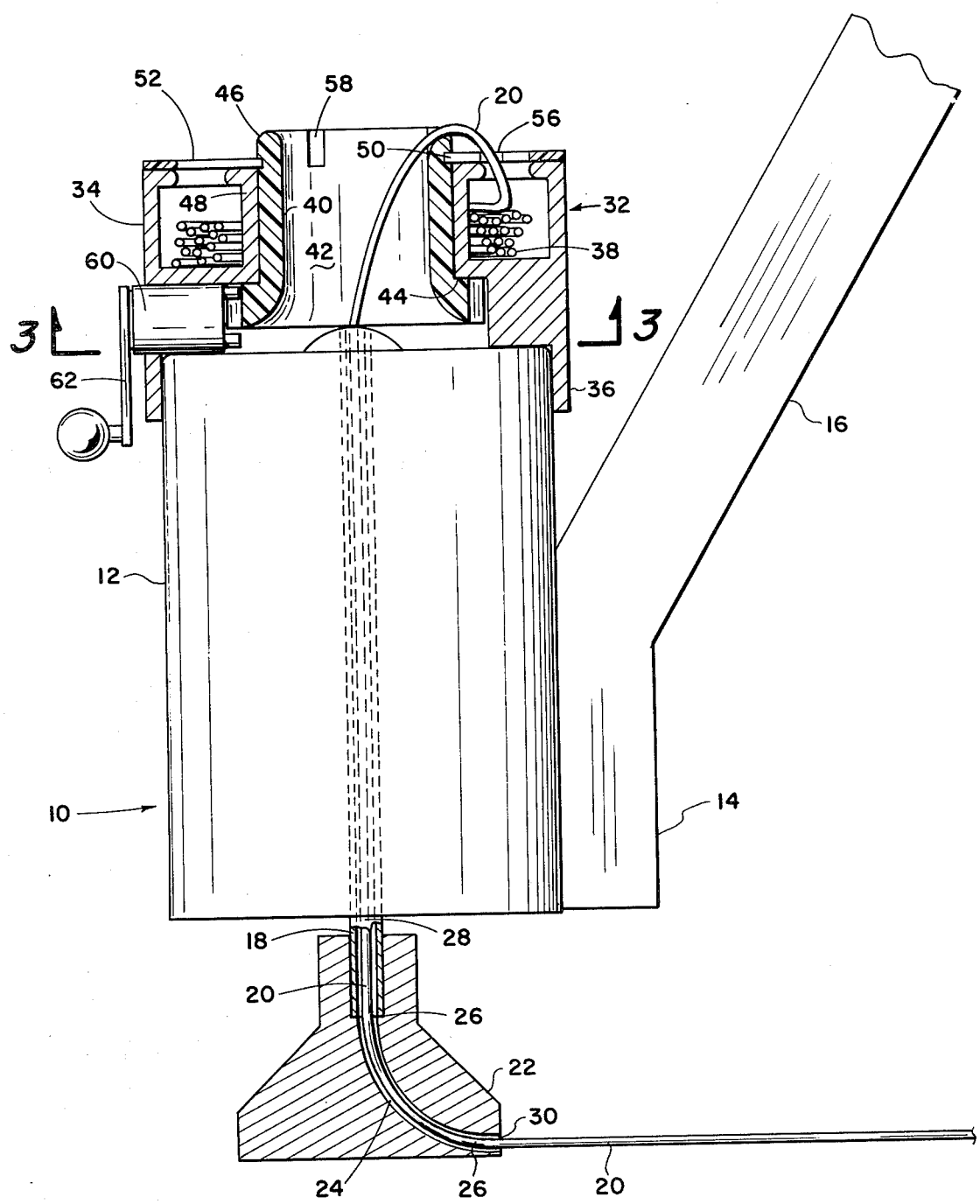
FIG. 1 is an elevational view, partly in section, of one embodiment of the invention.

Referring now to FIG. 1, reference character 10 generally indicates an improved hollow shaft filament trimmer. An electric motor 12 is mounted to frame 14 having a handle 16. Preferably, the trimmer 10 is lightweight in design for easy manipulation by hand to ideally trim those areas of vegetation which are inaccessible by conventional mowers or those areas where the terrain is rough and the use of conventional mowers creates considerable hazard to the operator. The motor 12 has an armature-driven output shaft 18 of sufficiently large inside diameter to receive a length of stiff filament line 20 extending therethrough.

A slinger head 22 is attached in any suitable manner to the lower end of output shaft 18, as shown in FIG. 1. An arcuate bore 24 extends through slinger head 22, the upper end 26 of said arcuate bore terminates in substantial alignment and in open communication with the hollow bore 28 provided by the shaft 18. The other end 30 of said arcuate bore 24 terminates on the outer periphery of slinger head 22 projecting generally in a radial direction from the hollow output shaft axis. The filament 20 extends through the arcuate bore 24 and protrudes from the slinger head for use as a cutting whip when in operation.

Figure 2:
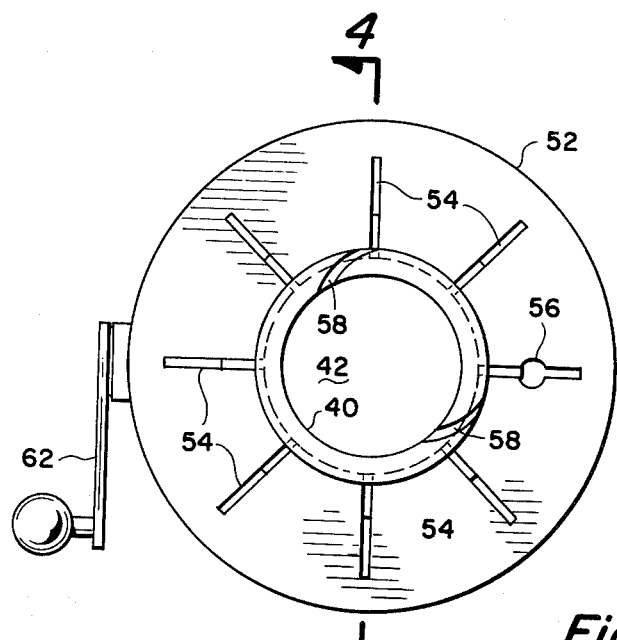
FIG. 2 is a top elevational view of one embodiment of the filament reserve.
Figure 3:
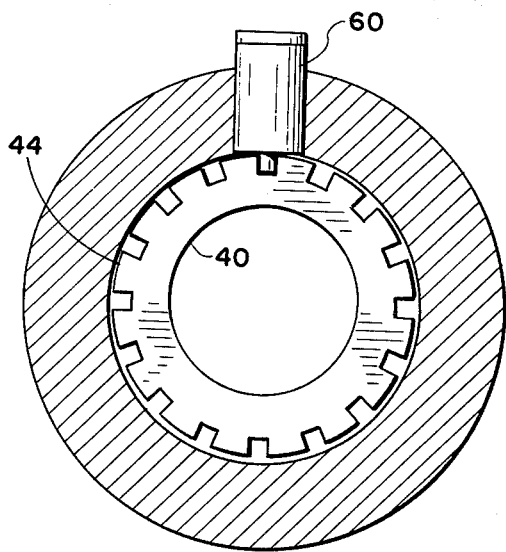
FIG. 3 is a view taken along line 3—3 of FIG. 1.
Figure 4:
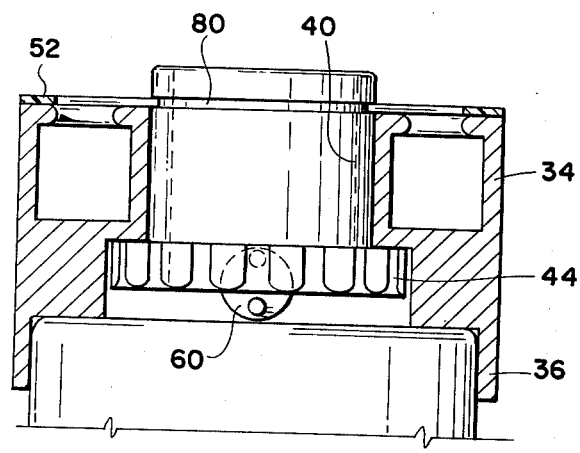
FIG. 4 is an elevational view, partly in section, of the filament reserve, taken along line 4—4 of FIG. 2.
Figure 7:
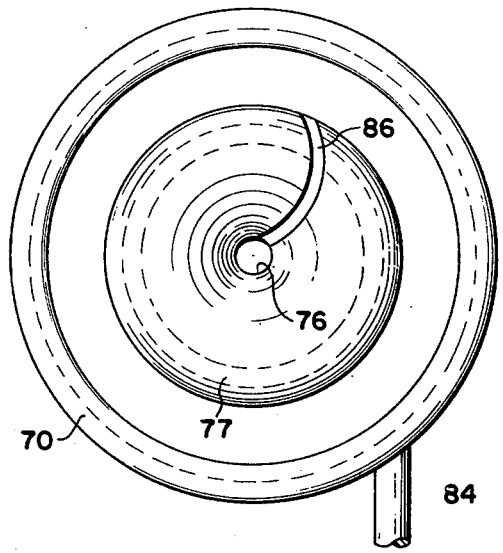
FIG. 7 is a view taken along line 7—7 of FIG. 5.

A filament reserve, referred to generally by reference character 32, is mounted above the motor 12 for holding a coiled supply of filament line. In one embodiment of the filament reserve, shown in FIGS. 1-4, the reserve comprises an annular supply cup 34 mounted to the top of electric motor 12 by means of a skirt 36 extending from the outer cup wall. A small aperture 38 is bored through the outer cup wall to provide a means for readily securing one end of the filament coil 20 placed within the cup annulus. A substantially cylindrical distributor 40 having central axial opening 42 therethrough is rotatably mounted in the central opening of annular supply cup 34. The bottom of distibutor 40, as oriented in FIG. 1, has a shoulder 44, and the top 46 of said distributor projects above the inner wall 48 of the annular cup 34. Distributor 40 is provided with a circumferential groove 50 in the outer periphery of the top thereof above inner cup wall 48 for receiving the cover cap 52. Cover cap 52 is preferably constructed of a stiff, flexible material such as plastic and is provided with a circularly shaped central aperture substantially equal in diameter to the diameter of the distributor groove 50. A plurality of slits 54 extend radially from the circular aperture of cup 52 as shown in FIG. 2 for ease in sliding the cup around the outer periphery of the distributor 40. A hole 56 offset from the center of cap 52 is bored through said cap in open communication with the annular supply cup. At least one slot 58 is provided in the top 46 of distributor 40. Slot 58 is preferably longitudinally slanted along a non-diametrical chord of the distributor rather than radially directed for reasons which will become apparent later.

Shoulder 44 of distributor 40 provides a circular rack along the outer perimeter thereof for engaging a two-toothed pinion gear 60 mounted in skirt 36 under the annular supply cup. A handle 62 is attached to the pinion gear for manually rotating the distributor.

In operation, one end of a coil of filament is passed through aperture 38 and knotted. The bulk of the filament is then coiled in annular cup 34. The loose filament end is threaded through hole 56 of the cover cap 52, passed through distributor slot 58, and down the central distributor opening 42 where the filament enters the hollow feed shaft. The filament is further threaded through the hollow shaft and the arcuate bore of slinger head 22. Actuation of the electric motor slings the filament protruding from the slinger head in a radial plane to the hollow shaft axis. As the cutting line wears or breaks, additional line can be fed to the slinger head by rotation of the distributor in the opposite direction of the filament winding. The length of filament protruding from the slinger head can also be retracted by simply reversing the direction of the distributor rotation. Distributor groove 58 and cover cap 52 prevent the line from being drawn through the trimmer by centrifugal force unless the distributor is rotated and thus affords a positive line metering mechanism not presented in the prior art.

Figure 6:
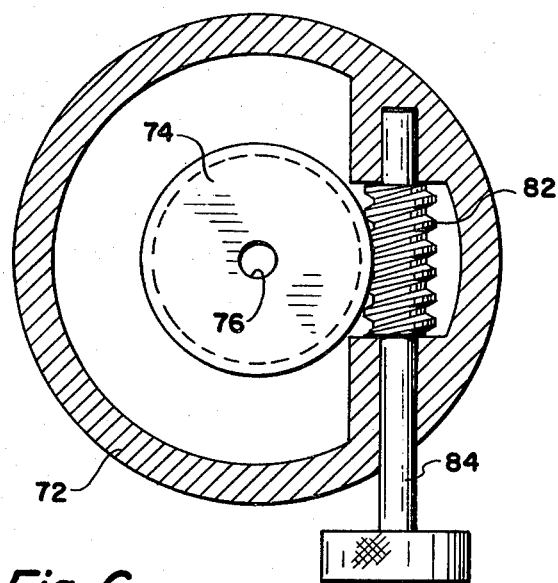
FIG. 6 is a view, partly in section, of the filament reserve taken along line 6—6 of FIG. 5.
Figure 5:
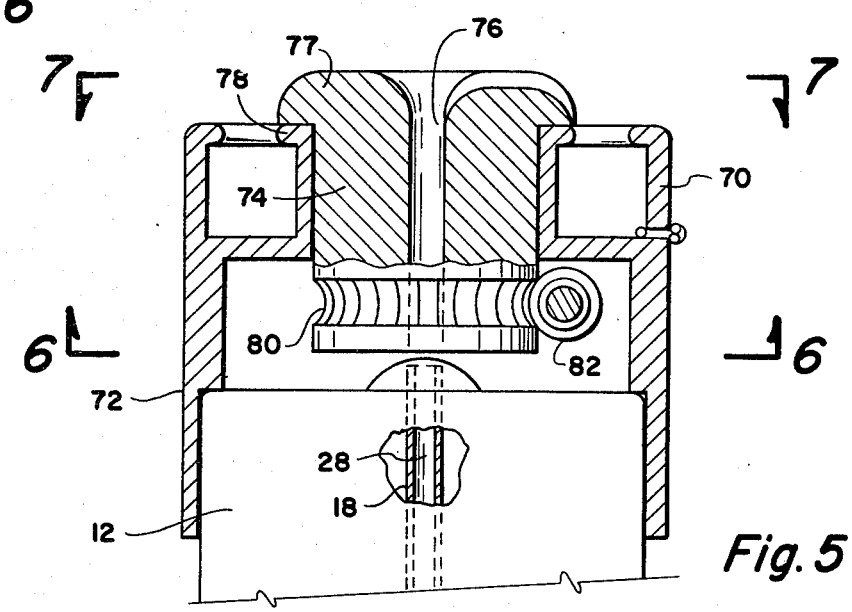
FIG. 5 is an elevational view, partly in section, of a second embodiment of the filament reserve.

In a second embodiment of the filament reserve as shown in FIG. 6, the filament reserve comprises an annular supply cup 70 mounted to the top of motor 12 by means of a skirt extension 72. A distributor 74 having a central aperture 76 therethrough in open communication and in substantial alignment with the hollow bore 28 of output shaft 18 is rotatably mounted in a center opening of annular cup 70 and the distributor head 77 thereof projects above the inner rim 78 of annular cup 70. The bottom periphery 80 of the distributor provides a wheel gear designed to mesh with a worm gear 82 mounted in any suitable manner to the underside of cup 70 and having a crank handle 84 extending through cup skirt 72. The distributor head 76 has at least one groove 86 leading from the center aperture toward the inner rim of annular cup 70, said groove being preferably curved.

In operation, a coil of filament is wrapped around the inner wall of the annular cup as in the previous embodiment, and the line is inserted through the distributor aperture 74, hollow shaft bore 28, and slinger head 22. Actuation of the electric motor imparts a centrifugal force to the filament line, drawing same tightly into the groove 84 of the distributor head. As the cutting line wears or breaks, additional line is fed to the slinger head by rotation of the distributor.

What is claimed is:

1. An improved filament-type weed-grass trimmer of the type in which a frame mounted drive means rotates a hollow output shaft having a conduit for the passage of filament therethrough from a non-rotatable supply to one end of said shaft, to a head affixed to the other end of said shaft and rotatable therewith, said head having an arcuate enclosed bore therethrough, one end of said bore substantially aligned and in open communication with the conduit of the hollow output shaft and the other end of said bore projecting outwardly from the head;

means for positively feeding defined increments of filament from said supply through said conduit in said hollow output shaft through said bore and thence outward of said head sufficient distance for trimming, said means for positively feeding defined increments of filament fed to said head comprising:

an annular cup mounted to the end of the fixed drive means opposite the head for holding a supply of filaments;

a distributor rotatably mounted to the center of the annular cup, and having a central opening therethrough in substantial alignment and in open communication with said one end of the hollow output shaft, and further having at least one groove in the head of said distributor for receiving and guiding filament from the annular cup to the distributor through said conduit in said hollow output shaft through said bore and thence outward of said head; and means for rotating the distributor to allow positive feed of the defined increment of filament passing from the annular cup to the distributor.

2. An improved trimmer as recited in claim 1, wherein the means for rotating the distributor comprises:

a circular rack affixed to the outer perimeter of the distributor interposed between the drive means and the annular cup;

a rotatably mounted pinion gear engageable with the rack; and a handle for rotating the pinion gear.

3. An improved trimmer of claim 1 wherein the means for rotating the distributor comprises:

a wheel gear affixed to the outer perimeter of the distributor and interposed between the drive means and the annular cup;

a rotatably mounted worm gear engageable with the wheel gear; and a handle for rotating the worm gear.

4. An improved filament trimmer as recited in claim 1 further comprising:

a cover cap for the annular cup removably mounted to the distributor having at least one hole in said cap in open communication with the annular cup to allow the passage of filament therethrough.

* * * * *